United States Patent [19]

Anlauf et al.

[11] 4,340,935
[45] Jul. 20, 1982

[54] METHOD OF TESTING THE OPERATIVENESS OF A CONTROL SYSTEM

[75] Inventors: Jurgen Anlauf, Goppingen; Wolf-Dieter Jonner, Sandhausen, both of Fed. Rep. of Germany

[73] Assignee: Robert Bosch GmbH, Stuttgart, Fed. Rep. of Germany

[21] Appl. No.: 64,625

[22] Filed: Aug. 7, 1979

[30] Foreign Application Priority Data

Sep. 22, 1978 [DE] Fed. Rep. of Germany ....... 2841220

[51] Int. Cl.³ .................... G06F 11/30; G06F 15/50
[52] U.S. Cl. ................................ 364/426; 303/92; 364/580; 371/3; 371/20
[58] Field of Search .................. 371/3, 20, 23, 25; 364/426, 578–580; 303/92

[56] References Cited

U.S. PATENT DOCUMENTS

| | | | |
|---|---|---|---|
| 3,907,378 | 9/1975 | Leiber | 303/92 |
| 4,106,821 | 8/1978 | Brearley | 303/92 |
| 4,158,884 | 6/1979 | McKinley et al. | 371/20 X |
| 4,192,180 | 3/1980 | Gerstenmeier et al. | 303/92 X |

Primary Examiner—Jerry Smith
Attorney, Agent, or Firm—Michael J. Striker

[57] ABSTRACT

A method of testing the operativeness of a vehicular anti-wheel-lock system of the type whose control device includes a self-monitoring circuit which, when the control device is switched on, initiates a test program and upon detection of system malfunction generates a malfunction signal and also switches off the control device. To test the self-monitoring circuit, the test program is repeatedly initiated by application of artificially generated wheel-rotational-speed signals and operating voltage is applied to the control device with each initiation of the test program. Predetermined faults are simulated, e.g., by the interruption of control lines of the control device, so that upon each implementation of the test program the production of a malfunction signal or the absence of one indicate whether the self-monitoring circuit is operating properly with respect to the fault being simulated. The signals which simulate wheel rpm can be abruptly removed to simulate wheel-lock whereupon the magnitudes of the currents which the control device causes to flow to the electromagnetic valves of the anti-wheel-lock system can be measured.

9 Claims, 2 Drawing Figures

METHOD OF TESTING THE OPERATIVENESS OF A CONTROL SYSTEM

BACKGROUND OF THE INVENTION

The present invention concerns methods for testing the operativeness of certain types of control systems. Control systems of the type here in question are provided with a feedback transducer for sensing the value of a monitored variable, a control device and actuatable adjuster units, the control device being provided with a self-monitoring circuit operative, when the control device is switched on, for implementing a testing program comprised of a sequence of test functions of operations devised to test the operativeness of the entire negative-feedback control system. In the event that the negative-feedback control system, as a result of the test program runthrough, is found to be inoperative or malfunctioning in any tested respect, the control device of the system is shut off and a malfunction indication is generated.

Such negative-feedback control systems are used, for example, in the context of anti-wheel-lock control in automotive braking systems. Such anti-wheel-lock systems are often provided with a built-in self-monitoring circuit. At the start of a trip, for example as the driver turns on the vehicle's engine, the self-monitoring circuit initiates a sequence of tests in accordance with a predetermined test program. If as a result of the test program the self-monitoring circuit ascertains that there is a malfunction in any tested part of the control system, a warning signal is triggered informing the user of the fact, e.g., a dashboard lamp becoming illuminated. This serves to inform the user that the anti-lock system has been shut off, and that he is not to rely on it during any possible hard braking.

Hard-braking contexts are hazardous by definition, and it is important that a driver know whether the anti-wheel-lock action afforded by his braking system is or is not operative, when commencing to brake very hard. A problem with systems of the type just outlined, is that the self-monitoring circuit itself may be inoperative or improperly functioning, so that despite inoperativeness of the anti-wheel-lock system, the user is not informed of the situation.

SUMMARY OF THE INVENTION

It is accordingly a general object of the invention to provide a system of the type outlined above, in which furthermore the operativeness and proper functioning of the self-monitoring circuit of the system is likewise tested.

In the preferred embodiment of the invention, when the control device of the control system is initially not yet switched on, artificially generated signals simulating predetermined values of control signals, and also operating voltage, are applied to the control device in order to initiate the test program, and the course of performance of the test program is automatically monitored. Upon completion of the test program without the generation of a malfunction signal, the test program is repeated with the simulation of a predetermined malfunction to ascertain whether a malfunction signal will actually result. The test program may then be performed a further time, with a different simulated malfunction. In this way, one or even a long sequence of simulated malfunctions are presented, and the response of the self-monitoring circuit to each ascertained.

Proceeding in accordance with the inventive technique, it is possible, if desired quite exhaustively, to ascertain correct operation of the self-monitoring circuit by making use of its own inherent malfunction-responsive actions, i.e., without having to provide a second self-monitoring circuit to monitor the operativeness of the first self-monitoring circuit in the sense that the first self-monitoring circuit has to monitor operation of the whole system. Instead, the means needed to perform the simulations of predetermined malfunctions to which the self-monitoring circuit is supposed to respond, need not be complex or extensive. Another advantage of the invention is that because predetermined malfunctions, to which the self-monitoring circuit is supposed to respond, are simulated in sequence, failure of the self-monitoring circuit to generate a warning signal in response to one of these simulations indicates, inherently, which malfunction the self-monitoring circuit is presently incapable of detecting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
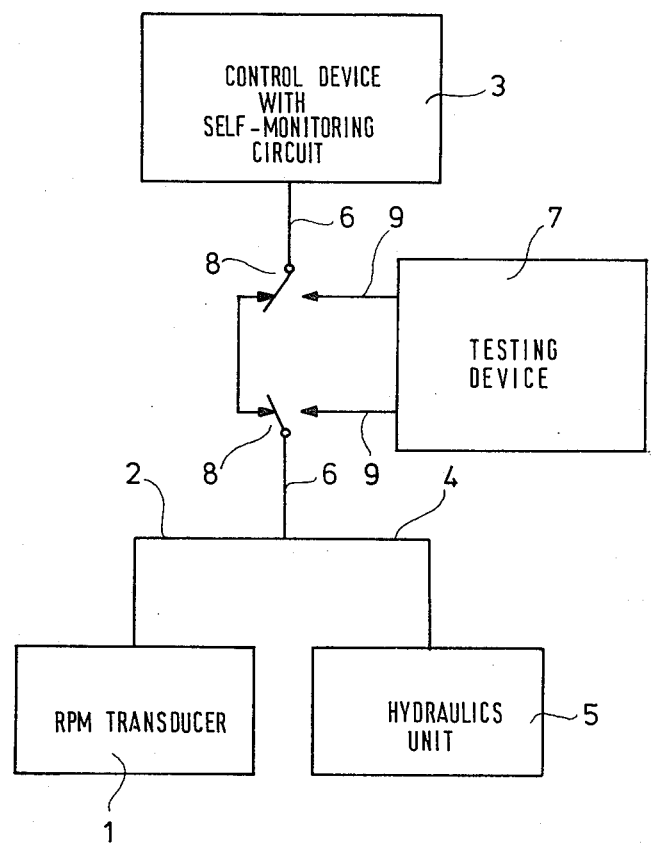
FIG. 1 is a schematic block diagram of a negative-feedback control system provided with a testing device which can be switched into circuit with the control system for implementing the inventive method.

FIG. 1 very schematically depicts, as an example of a negative-feedback control system with which the invention would be concerned, an anti-wheel-lock system for vehicular braking systems. The anti-wheel-lock system includes an rpm feedback transducer unit 1 which, in conventional manner, senses the rotary speeds of the wheels of a vehicle and transmits corresponding rpm signals via a cable 2 to the control device 3 of the anti-wheel-lock system. The control device 3 contains all the usual signal-evaluating circuitry of such an anti-wheel-lock system, e.g., circuitry for ascertaining the differences in rotary speed as among different braked and unbraked wheels, circuitry for responding to rates of change of rotary speed of abruptly braked wheels, and so forth, such control devices being familiar to persons familiar with anti-wheel-lock systems. The control device 3 converts its evaluations of braking performance into actuating signals which are transmitted via a cable 4 to the hydraulics unit 5 of the system, e.g., to actuate valves to lower hydraulic braking pressure when a skid is developing, and so forth. The cables 2 and 4 branch together to form a common cable 6, into which a testing device 7 can be connected in circuit by means of changeover switches 8. Instead of changeover switches 8, e.g., when the system is not permanently to be provided with the testing device 7, use can be made of corresponding plug-and-socket connectors for connecting the cables 9 of testing device 7 into circuit with cable 6. As already indicated, the hydraulics unit 5 of the anti-wheel-lock system typically comprises a set of electromagnetically controlled valves each associated with one respective brake wheel of the vehicle and controllable for varying the braking force applied to each individually associated vehicle wheel.

At its simplest, the control device 3, in addition to amplifiers and other such signal-processing circuitry, may comprise for example four circuit stages each operative for monitoring the rate of change of rotary speed of a respective one of the four braked wheels of a vehicle. When the rotary-speed decrease attendant to the deceleration of braking exhibits a rate of change in excess of a predetermined magnitude, for a particular one of the braked wheels, the control device 3 sends out to hydraulics unit 5 a control signal commanding that the braking force applied to that wheel be lowered, in order to prevent the onset of skidding or wheel lock. This rate of rotary-speed change evaluating circuitry may, for example, comprise four storage-capacitor circuits, each storage capacitor of which can react to changes in value of the rpm signal of the associated wheel up to a predetermined maximum rate of change, but for rates of change higher than the maximum instead transmits a signal resultant from the abrupt rate of rpm change.

The control device 3 additionally includes a self-monitoring circuit which is operative, when the vehicle is being started up, for automatically implementing an internal test program which serves to test the anti-wheel-lock system with respect to predetermined possibilities of malfunction. If as a result of the test program a malfunction or improper operation is detected, a warning is generated for the driver, e.g., by the illumination of a dashboard warning light, and simultaneously the anti-wheel-lock system is automatically shut off. However, automatic shutoff of the anti-wheel lock system and the generation of the warning signal do not occur if it is the self-monitoring circuit itself which is malfunctioning.

Figure 2:
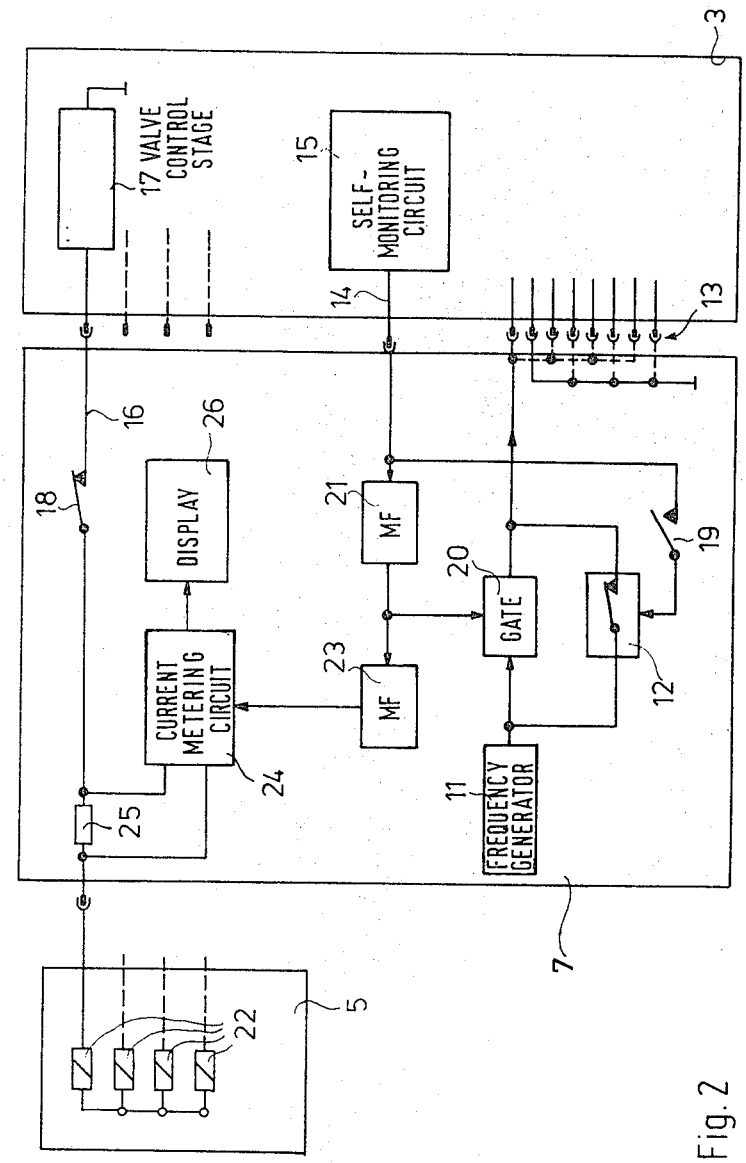
FIG. 2 is a schematic block diagram of an embodiment of the testing device, along with parts of the control system of FIG. 1.

FIG. 2 schematically depicts the internal configuration of a testing device 7 used in accordance with the present invention, as well as components of the anti-wheel-lock system. The testing device 7 includes a pulse or A.C. waveform generator 11 which generates a signal simulating a wheel-rpm feedback signal such as is applied to the anti-wheel-lock system during normal operation of the system. This simulated-rpm signal is transmitted via a normally conductive electronic switch 12 and applied to a set of contacts 13, which in turn are connectable via plug-and-socket connections, or the equivalent, to the four rpm feedback-signal inputs of control device 3. In addition to this simulated-rpm signal, when testing device 7 is switched on, operating voltage is furnished to control device 3, via non-illustrated connections, as a result of which the self-monitoring circuit 15 internal to control device 3 initiates implementation of the test program and, upon completion of the test program, transmits a pulse via line 14 to testing device 7. This pulse serves to inform testing device 7 that the test program implemented by self-monitoring circuit 15 has been finished. If the self-monitoring circuit 15 has not ascertained the presence of a malfunction, this can be attributed to the fact that the self-monitoring circuit 15 is itself defective in operation. To test the self-monitoring circuit 15, the test program is reinitiated, but only after a malfunction has been simultated, by interruption of looped lines performed by testing device 7. In FIG. 2 only one such line 16 is depicted, which connects the valve-control stage 17 of control device 3 with the hydraulics unit 5 of the system. Connected in this line 16 is a switch 18 which can be opened to simulate a fault in this line. After switch 18 is opened the test program is reinitiated, and if the self-monitoring circuit is operating properly with respect to this possible malfunction a malfunction signal is generated by self-monitoring circuit 15. In contrast, if self-monitoring circuit 15 issues no malfunction signal and instead transmits a pulse via line 14 at the end of the test program, this serves to indicate that the self-monitoring circuit is defective. The type of malfunction or fault simulated furthermore provides an indication of what part or aspect of the self-monitoring circuit, or what part of the test program, is defective. It will be understood that testing device 7 may have a switch like switch 18 for each connection between control circuit 3 and other components of the anti-wheel-lock system, for instance in each line leading from valve-control stage 7 to the solenoid 22 of a respective one of the solenoids associated with individual braked wheels in hydraulics unit 5, between control device 3 and the individual rpm feedback transducers of the rpm feedback stage 1, and so forth. It is likewise possible to loop special lines of control device 3 through the testing device 7 in order to be able to test these lines with respect to faults. It will be understood that when a plurality of switches such as switch 18 is provided the switches can be closed and then opened in accordance with a predetermined program, with the test program implemented by self-monitoring circuit 15 being reinitiated each time a different one of such succession of switches is closed, until such time as despite the simulated fault or malfunction no malfunction signal is triggered.

If it emerges that the self-monitoring circuit 15 is not operating correctly, then testing of the anti-wheel-lock system can be performed by testing the electronic control device 3 itself. To this end, a switch 19 is closed, connecting line 14, on which the end of program pulse is furnished, with the electronically controllable switch 12, so that the appearance of the end of program pulse have the result of rendering switch 12 non-conductive. Frequency generator 11 is then connected to the contacts 13 via a gate 20, gate 20 being maintained transmissive for the duration of a gating pulse furnished by a monostable circuit 21. Monostable circuit 21 is triggered by the end of program pulse furnished by self-monitoring circuit 15, so that control device 3 upon completion of the test program continue to receive rpm-simulating signals via the gate 20 for a predetermined limited time interval, the rpm-signals furnished simulating a predetermined speed. At the end of the gating pulse furnished by monostable circuit 21, gate 20 becomes nontransmissive, so that control device 3 no longer receive simulated-rpm signals. This disappearance of simulated-rpm signals simulates locking of the braked wheels. This wheel-lock situation should result in a response on the part of the solenoid valves 22 of hydraulics unit 5. Accordingly, upon simulation of wheel-lock, control device 3 should supply to solenoid valves 22 a signal commanding that they reduce braking force. Thus, the operativeness of control device 3 can be tested by measuring the current which it supplies to the solenoid valves. The duration of the gating pulse furnished by monostable circuit 21 is such that the rpm-signal storing capacitors referred to earlier have enough time to assume stored rpm-signal values so dimensioned that, upon occurrence of simulated wheel-lock, enough time remains for one or a plurality of current measurements to be performed. The flow of current begins with the abrupt removal of the simulated-rpm signals and terminates at the latest when the stored rpm values, which upon simulated wheel-lock decrease at the maximum rate of change of which the signal-storing capacitors are capable, drop below a predetermined lower threshold value. It is accordingly necessary that the current measurements be performed exactly within this time interval. To this end, the trailing flank of the gating signal furnished by monostable circuit 21 is used to trigger a second monostable circuit 23 which furnishes a gating pulse to a current-metering stage 24, the latter performing a measurement of solenoid current in cooperation with a series resistor 25 connected in a respective solenoid current path; current-metering stage 24 is provided with a display 26 for display of the measured current value. If the indicated current value lies within prescribed limits, then this is an indication of correct functioning of the control device 3 in such respect. It will be understood that in order to test control device 3 other signals and values of signals can be applied to it in order to monitor other aspects of the operation of the control device, to ascertain whether the magnitudes of the signals generated by control device 3 are in accordance with the negative-feedback control action which control device 3 is intended to implement.

It will be understood that each of the elements described above, or two or more together, may also find a useful application in other types of circuit configurations differing from the types described above.

While the invention has been illustrated and described as embodied in the context of an anti-wheel-lock system for vehicular braking systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of testing the operativeness of a negative feedback control system employing at least one feedback transducer comprising:
providing a feedback signal from the feedback transducer to control circuit means;
generating actuating signal depending on the feedback signals for actuating adjuster elements with the actuating signals; applying to the control circuit means artificially generated signals simulating those furnished by at least one feedback transducer;
applying operating voltage to the control circuit means in order to initiate a predetermined test program; monitoring the course of implementation of the test program;
at least one reinitiating the test program upon completion of the initiated test program and if no malfunction signals had been produced, but now with a predetermined malfunction simulated;
determining upon each completion of the test program the production of a malfunction signal or the absence of a malfunction signal to indicate whether a self monitoring circuit means is or is not operating correctly with respect to the malfunction simulated; and
generating a malfunction signal upon detection of a malfunction exhibited by the circuit control means as an output signal.

2. The method defined in claim 1, each time that the test program is performed and the self-monitoring circuit produces a malfunction signal then reinitiating the test program but with the artificially generated signals which simulate those from the feedback transducer being changed in value in accordance with a predetermined scheme to ascertain the response of the negative-feedback control system to the new values of the artificially generated signals.

3. The method defined in claim 1, the negative-feedback control system being the anti-wheel-lock system of a vehicular braking system, the at least one feedback transducer comprising a set of rpm feedback transducers for respective braked wheels of a vehicle, the artificially generated signals simulating different wheel rotation speeds, the adjuster elements being electromagnetic valves, the faults being simulated by interrupting electrical lines of the control circuit means.

4. The method defined in claim 3, upon each completion of the test program maintaining a signal simulating wheel rotation speed for a predetermined time interval at a predetermined value simulating a particular wheel rotational speed in order to establish a definite time interval during which current flows to an electromagnetic valve, and then changing the value of the signal simulating wheel rotational speed to a value simulating wheel-lock and then during the ensuing predetermined time interval measuring the current flowing to the electromagnetic valve.

5. A control system comprising:
a transducer responsive to a physical variable;
a control device connected to the output of the transducer and including a self-monitoring circuit;
a testing device comprising:
a frequency generator;
a gate connected to the output of the frequency generator and to an input of the control device;
an electronic switch connected in parallel to the gate and connected to and controlled by the output of the self-monitoring circuit; a first monoflop connected to the output of the self-monitoring circuit and to the gating input of the gate for controlling the gate;
a second monoflop circuit connected to and controlled by the output of the first monoflop;
final control elements connected to the output of the control device; and
measuring device connected to a final control element for determining its parameters of operation and connected to the output of the second monoflop for providing initiation.

6. The control system according to claim 5 further comprising display unit connected to an output of the measuring device.

7. The control system according to claim 5 wherein the final control elements are solenoid valves of a hydraulic unit.

8. The control system according to claim 7 wherein the control device comprises a valve control stage connected to the input of the solenoid valve.

9. The control system according to claim 8 further comprising:
switch disposed in the connection line between the valve control stage and the solenoid valves.

* * * * *